No. 833,333. PATENTED OCT. 16, 1906.
W. J. NEWMAN.
DIGGING OR EXCAVATING APPARATUS.
APPLICATION FILED OCT. 3, 1905.
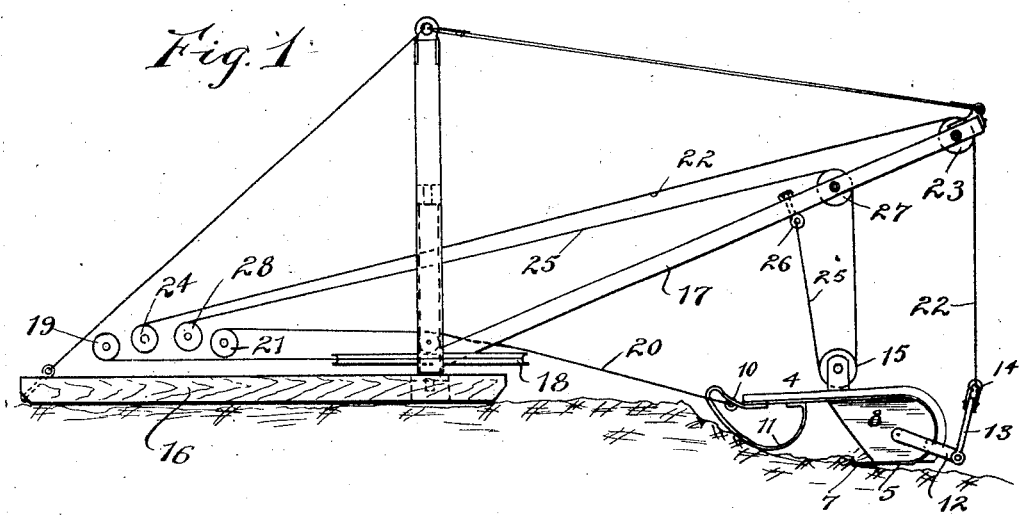
Fig. 1.
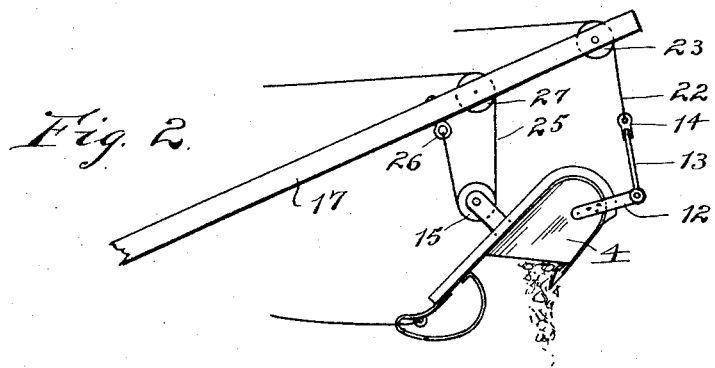
Fig. 2.
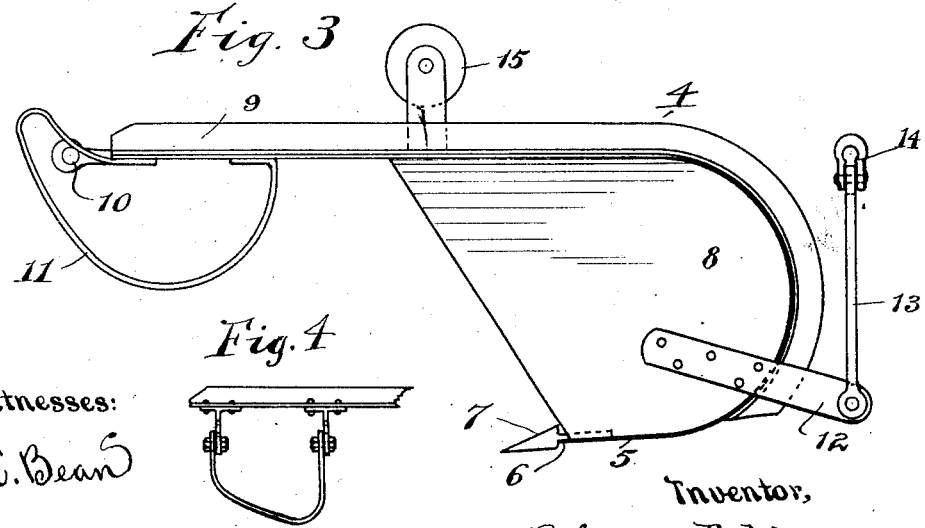
Fig. 3.
Fig. 4.
Witnesses:
B. C. Bean
C. B. Hiney.
Inventor,
William J. Newman,
By Glenn S. Noble Att'y.

UNITED STATES PATENT OFFICE.

WILLIAM J. NEWMAN, OF CHICAGO, ILLINOIS.

DIGGING OR EXCAVATING APPARATUS.

No. 833,333.    Specification of Letters Patent.    Patented Oct. 16, 1906.

Application filed October 3, 1905. Serial No. 281,140.

*To all whom it may concern:*

Be it known that I, WILLIAM J. NEWMAN, a citizen of the United States, and a resident of Chicago, in the county of Cook and State of Illinois, have invented certain new and useful Improvements in Digging or Excavating Apparatus, of which the following is a specification.

This invention relates more particularly to such excavating shovels or devices as shown in my Letters Patent No. 794,243, issued July 11, 1905, and comprises improvements in such shovels or devices and in the apparatus or method of operating the same. Its objects are to provide a simple, durable, and effective digging apparatus that will successfully dig hard and unyielding materials, as well as light earth or other soil, which is ordinarily encountered in excavating. By means of my improved apparatus substantially the same work may be done with a light simple contrivance as is now performed with heavy steam-shovels.

In the accompanying drawings, illustrating my invention, Figure 1 is a side elevation of a complete digging apparatus shown in operation, various parts being shown diagrammatically. Fig. 2 is a view showing the excavating shovel or scoop in dumping position, and Fig. 3 is an enlarged side view of my improved scoop or shovel. Fig. 4 is a detail showing an adjustable shoe.

As shown in the drawings, 4 represents the digging device as a whole, such device comprising substantially an inverted scoop or shovel, with the bottom 5 provided with a cutting edge 6 and, if desired, with teeth or plows 7, similar to those shown in my prior patent. The shovel is closed at the sides by means of side plates 8, so that the receiving portion is of a semicircular form somewhat in the shape of a half-cylinder. The top of the shovel projects forward for some distance and is braced by means of angle-irons or other suitable-shaped braces 9, which extend back and are bent around the rear portion of the shovel. The shovel is drawn forward for filling by means of a cable, which is secured to the projecting top part of the shovel, as by means of an eye or fastening 10. In order to prevent the shovel from running too deeply into the ground, I have provided shoes 11 at the forward end, which rests upon the ground and direct the shovel, as shown in Fig. 1. These sliding shoes or guides form an effective and practical means for guiding the shovel while it is being filled and prevent the forward part, to which the drag-cable is attached, from running into the ground when the shovel is digging. These shoes form an important feature of this invention, and it will be noted that they may be attached directly to the forwardly-projecting part of the rigid frame or to any equivalent projection or bail which would serve as an attachment for the drag-line. At the rear of the shovel are braces or arms 12, to which is secured a bail 13. The dumping-cable is secured to this bail by means of a clevis 14. At about midway at the top of the scoop is mounted a sheave 15 for engagement with a lifting-cable.

This improved digging device is adapted to be used in a large variety of ways, and I have illustrated in Figs. 1 and 2 one method of operating the same. 16 represents as a whole a derrick having a projecting mast or boom 17, which is pivotally mounted and is adapted to be turned by a bull-wheel 18, which is operated by a cable from a drum 19. The pulling-cable 20, which is attached at the front end of the shovel, is operated by a second drum 21, and the dumping-cable 22, which is fastened to the clevis 14, passes up over a sheave 23 at the end of the boom and then to a winding-drum 24. The third or lifting cable 25 is preferably secured at one end to an eyebolt or fastening 26 in the boom and then passes down under the sheave 15 and then up and over a sheave 27 on the boom and then down to the winding-drum 28.

The shovel is filled by means of the drawing-cable 20, which pulls on the front of the frame, thereby causing the teeth or cutting edge to dig into the soil until the shoes 11 rest on the ground. As the cable 20 is wound up it draws the shovel forward until the same is filled. Then this cable is paid out and the lifting-cable 25 is wound up until the shovel assumes such a position that the load will remain in the same. If desired, the dumping-cable 22 may be partially wound up at the same time the lifting-cable is being operated. When the shovel has been raised to the desired height, the boom 17 is swung around until the shovel is over the spill bank or wagon or wherever it is to be discharged, and then the dumping-cable 22 is wound up to cause the shovel to assume the position shown in Fig. 2, and thereby discharge the contents.

This apparatus is particularly adapted for digging ditches or the like, as the weight of the apparatus is at some distance ahead of the ditch instead of being over the ditch or behind the face which is being excavated. This will obviate caving banks and also obviate the necessity of clearing away material to move the apparatus ahead.

While I have shown a practical and successful method of operating the excavating device, it is obvious that various changes may be made in the details of construction or mode of operation which will come within the spirit of my invention, and I do not wish to limit myself to the exact construction illustrated herein and described in the specification. It will also be noted that as the actual derricks or apparatus used in practical operation are large and somewhat cumbersome affairs with more or less complicated machinery necessary for their operation no attempt has been made to introduce the detail of construction into the illustration showing the derrick as a whole.

What I claim, and desire to secure by Letters Patent, is—

1. A digging device comprising a scoop, a forward extension to which the drag-cable is connected, and sliding shoes or guides on said extension.

2. The combination with a scoop, of a forward extension to which the drag-cable is connected, and shoes or slides on said extension.

3. A digging-shovel comprising a receptacle having a forwardly-projecting top frame for attachment with the drag-cable, cutting devices on the forward edge of said shovel at some distance back of the point of attachment for the cable, and shoes or slides to guide said shovel and to regulate the distance to which the cutting devices will project into the ground.

4. The combination with a digging or excavating shovel, of shoes or slides for guiding said shovel.

5. In an excavating and lifting apparatus, the combination of a digging device comprising a receptacle resting substantially on one side while in digging position, the forward edge of said bottom side being adapted to gather material into said receptacle, means for attaching the drag-cable at a distance above and forward of the digging edge, shoes or the like for guiding said digging device, a sheave or the like at the top of said device for raising the same after the material has been gathered into the receptacle, and means at the rear end of said device for elevating the same to discharge the contents.

6. In an excavating apparatus, the combination of a shovel comprising a receptacle adapted to rest substantially on one side while in digging position, cutting and digging means on the forward edge of the bottom side adapted to loosen material and gather the same into the receptacle, shoes for guiding said device, a forward drag-cable for filling said device, lifting means adapted to engage with said shovel at a point forward of the load whereby the shovel will tip up to hold the load therein, and means connected with the rearward end of said shovel for raising the same to discharge the load.

7. In an excavating apparatus, the combination of a boom, an excavating and elevating shovel, means for dragging said shovel forward for filling the same, means connected with said boom for raising said shovel and means connected with said boom for tipping said shovel to discharge the same.

8. In an excavating device, the combination of a boom-derrick, an excavating and lifting shovel 4, a forward drag-cable for filling said shovel, a sheave on said shovel, a lifting-cable passing around said sheave and operating from said boom, and a discharge-cable secured to a bail at the rear end of said shovel and operating over a sheave in said boom.

WILLIAM J. NEWMAN.

Witnesses:
C. B. HINEY,
MILTON F. STEIN.